(12) United States Patent
Brown

(10) Patent No.: US 9,764,734 B1
(45) Date of Patent: Sep. 19, 2017

(54) STABILITY CONTROL SYSTEM

(71) Applicant: Hydro-Gear Limited Partnership, Sullivan, IL (US)

(72) Inventor: Alyn Brown, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 15/082,425

(22) Filed: Mar. 28, 2016

Related U.S. Application Data

(60) Provisional application No. 62/138,872, filed on Mar. 26, 2015.

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 30/04* | (2006.01) | |
| *B62D 11/00* | (2006.01) | |
| *B62D 11/04* | (2006.01) | |
| *B60L 11/12* | (2006.01) | |
| *G05D 1/08* | (2006.01) | |

(52) U.S. Cl.
CPC ............ *B60W 30/04* (2013.01); *B60L 11/123* (2013.01); *B62D 11/003* (2013.01); *B62D 11/04* (2013.01); *G05D 1/0891* (2013.01); *B60W 2030/041* (2013.01); *B60W 2030/043* (2013.01); *G05D 2201/0208* (2013.01)

(58) Field of Classification Search
CPC ..... B60L 11/123; B62D 11/003; B62D 11/04; G05D 1/0891

USPC .......................................................... 701/22
See application file for complete search history.

(56) References Cited

U.S. PATENT DOCUMENTS

| | | |
|---|---|---|
| 5,197,008 A | 3/1993 | Itoh et al. |
| 5,906,645 A | 5/1999 | Kagawa et al. |

(Continued)

OTHER PUBLICATIONS

Bendix EC-60 ABS/ATC/ESP Controllers Service Data, BW2429, Bendix Commerical Vehicle Systems LLC, May 2005.

(Continued)

*Primary Examiner* — Maceeh Anwari
(74) *Attorney, Agent, or Firm* — Neal, Gerber & Eisenberg LLP

(57) ABSTRACT

A drive and control system is disclosed for use on a zero turn vehicle having a pair of drive motors, an operator drive input capable of providing a drive signal corresponding to a desired drive status by an operator and an operator steering input capable of providing a steering signal corresponding to a desired steering of the vehicle. Sensors on the vehicle generate signals corresponding to roll, pitch and yaw. A stability control module includes a processor receiving the steering and drive inputs and provides output signals to the drive motors. Upon initialization of the vehicle, the processor determines initial orientation parameters from the sensors and determines if the input and steering are in neutral. When the drive input is not in neutral, and the steering is in neutral, the processor determines desired pitch, yaw and roll parameters. The processor receives additional sensor signals during operation to monitor pitch and roll of the vehicle and if a measured parameter exceeds the desired parameter, the processor will vary the output signals to the drive motors to provide a heading correction to the vehicle.

23 Claims, 8 Drawing Sheets

(56) References Cited

U.S. PATENT DOCUMENTS

| | | |
|---|---|---|
| 7,499,775 B2 | 3/2009 | Filippov et al. |
| 7,590,481 B2 | 9/2009 | Lu et al. |
| 8,275,516 B2 | 9/2012 | Murphy |
| 8,483,911 B2 | 7/2013 | Reich |
| 8,490,722 B2 | 7/2013 | Koga et al. |
| 8,712,639 B2 | 4/2014 | Lu et al. |
| 2014/0371975 A1 | 12/2014 | Biber et al. |

OTHER PUBLICATIONS

Electronic Stability Control Manual, Freescale Semiconductor, Inc., STABCTRLFS Rev. 5, 2012.
Inertial Technology for North Finding Brochure, Silicon Sensing Systems, Ltd., Dec. 2013.
Wabco Electronic Stability Control (ESC) Informational Sheet, Obtained from website <http://www.wabco-auto.com> on Feb. 19, 2015.
"Methodological approach to assess tractor stability in normal operation in field using a commercial warning device," Journal of Agricultural Engineering 2013, vol. XLIV (s2):e132.

STABILITY CONTROL SYSTEM

CROSS-REFERENCE TO RELATED APPLICATION

This application claims the benefit of U.S. Provisional Patent Application No. 62/138,872, filed Mar. 26, 2015. This prior application is incorporated herein by reference in its entirety.

BACKGROUND OF THE INVENTION

This invention relates to a system and method of providing stability control to a driven vehicle, and in particular a utility vehicle having electrically-powered right and left-side ground drives to provide propulsion and steering, such as a zero turn mower or similar utility vehicle. The vehicle may include a standard steering wheel and pedal control system, or it may be controlled by a pair of control sticks or a joystick linked to drive motors.

SUMMARY OF THE INVENTION

The system disclosed herein provides stability control and related features and benefits, including straight line tracking, wheel slip and traction control, hillside stability and rollover protection. These features are important for use in such vehicles used on uneven terrain and on slopes. The present system has advantages on hillsides, for example, where straight line tracking can be accomplished without the additional complexity associated with front wheel steering mechanisms for zero turn vehicles, such as those illustrated in U.S. Pat. No. 8,950,520 or without the burden of an operator differentially steering the vehicle across the hillside.

The benefits and features of the system disclosed herein are accomplished using a 3-axis gyroscope, a 3-axis accelerometer, input from the vehicle accelerator and input from the vehicle steering system. The present design provides the features disclosed herein without the need for wheel speed sensors, thereby reducing the cost and complexity of the design.

A better understanding of the invention will be obtained from the following detailed descriptions and accompanying drawings, which set forth illustrative embodiments that are indicative of the various ways in which the principles of the invention may be employed.

DETAILED DESCRIPTION OF THE DRAWINGS

Figure 1:
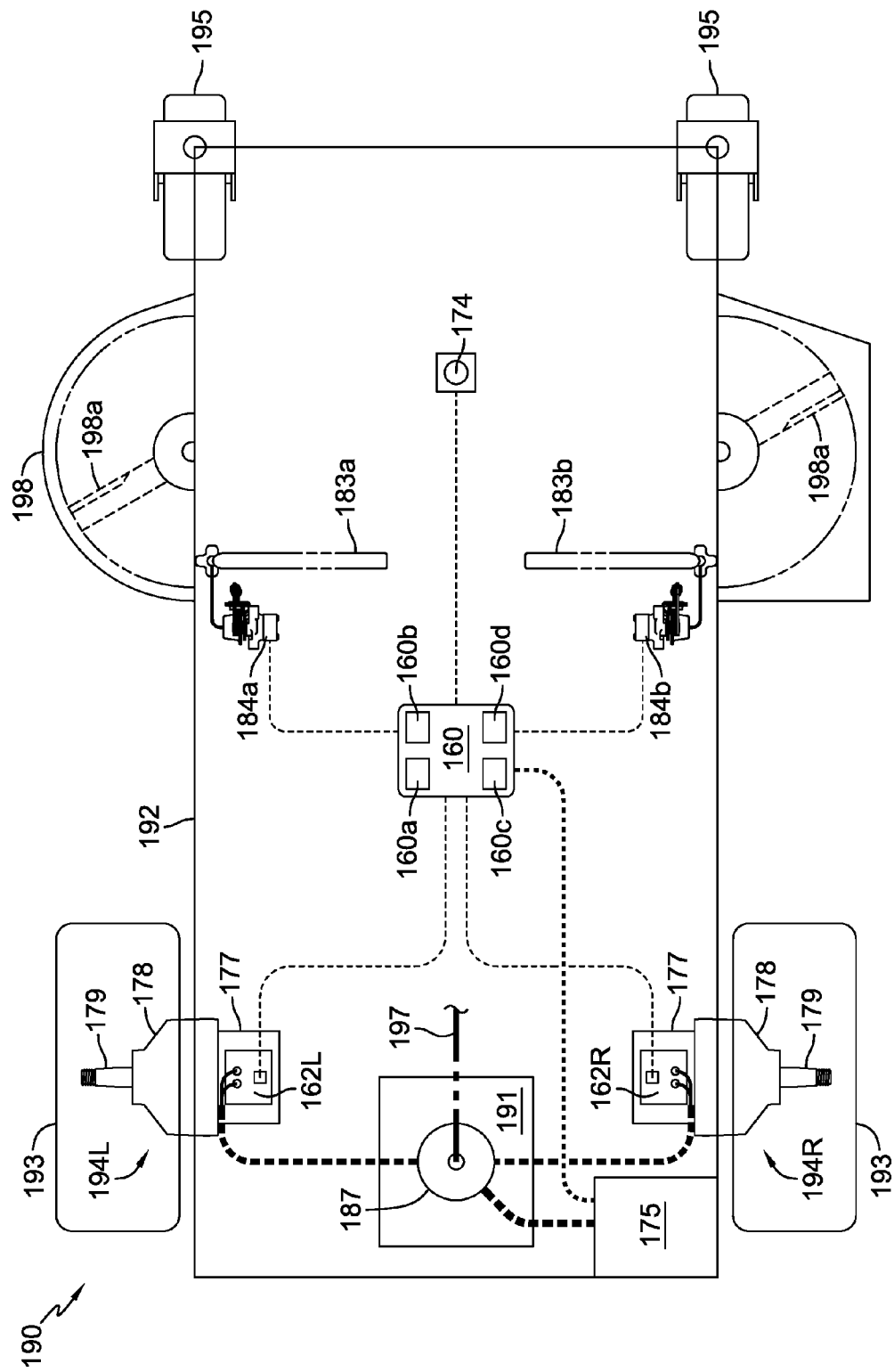
FIG. 1 is a schematic view of a vehicle having control sticks that incorporates a stability control system in accordance with the present invention.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. For example, the internal combustion engines 191, 291 depicted in FIGS. 1 and 2, respectively, may be presumed to function in substantially the same manner unless otherwise stated herein. Additionally, the drawings set forth herein are schematic and not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 depicts a first zero turn vehicle 190 incorporating an embodiment of the stability control system. Vehicle 190 is a hybrid powered vehicle having a frame 192 on which is mounted an internal combustion engine 191 turning a generator 187 that provides electrical energy to a left-side ground drive 194L and a right-side ground drive 194R. Internal combustion engine 191 further drives a mowing deck 198 having a plurality of mowing blades 198a by means of a belt and pulley system 197 in a known manner, such as by selective engagement with a manual or electric clutch pulley (not shown).

Each of the ground drives have an electric motor 177, a gear reduction 178, and an output axle 179 engaged to a drive wheel 193 to provide propulsion and steering. Vehicle 190 also has a pair of non-driven, non-steered caster wheels 195 supporting its frame 192 that freely pivot and track in response to the steering impetus provided by the drive wheels 193. Each ground drive 194L, 194R has a motor controller 162L, 162R respectively, that apportions current from generator 187 to its electric motor 177 in response to control signals from a processor in stability control module 160. The control signals are generated, in part, in response to the control inputs initiated by an operator manipulating left and right-side control sticks 183a, 183b engaged to a pair of accelerator devices, such as the potentiometers 184a, 184b respectively, depicted in FIG. 1. Movement of a control stick in a forward direction produces forward rotation of the output axle 179 and drive wheel 193 of the corresponding left or right-side ground drive 194L, 194R, whereas movement of a control stick in a reverse direction produces reverse rotation of the respective output axle 179 and drive wheel 193. The degree to which the sticks are rotated forward or back produces a proportionate, scalable output from the ground drives 194L, 194R. In between forward and reverse lies a scalable deadband akin to a neutral position. It is this independent control of the left and right-side drive wheels that produces the considerable maneuverability that zero turn vehicles are known for. The interaction of operator inputs as translated and modified by the processor of stability control module 160 in response to sensed conditions will be detailed further below. Generator 187 further provides energy to a battery 175 that provides electrical energy for stability control module 160 and the various signal generating sensors and output devices completing the drive and stability control systems of vehicle 190. Generator 187 may include a controller to regulate electrical system voltages at battery 175, which serves as an energy buffer to the output of generator 187 at peak system loads.

Figure 2:
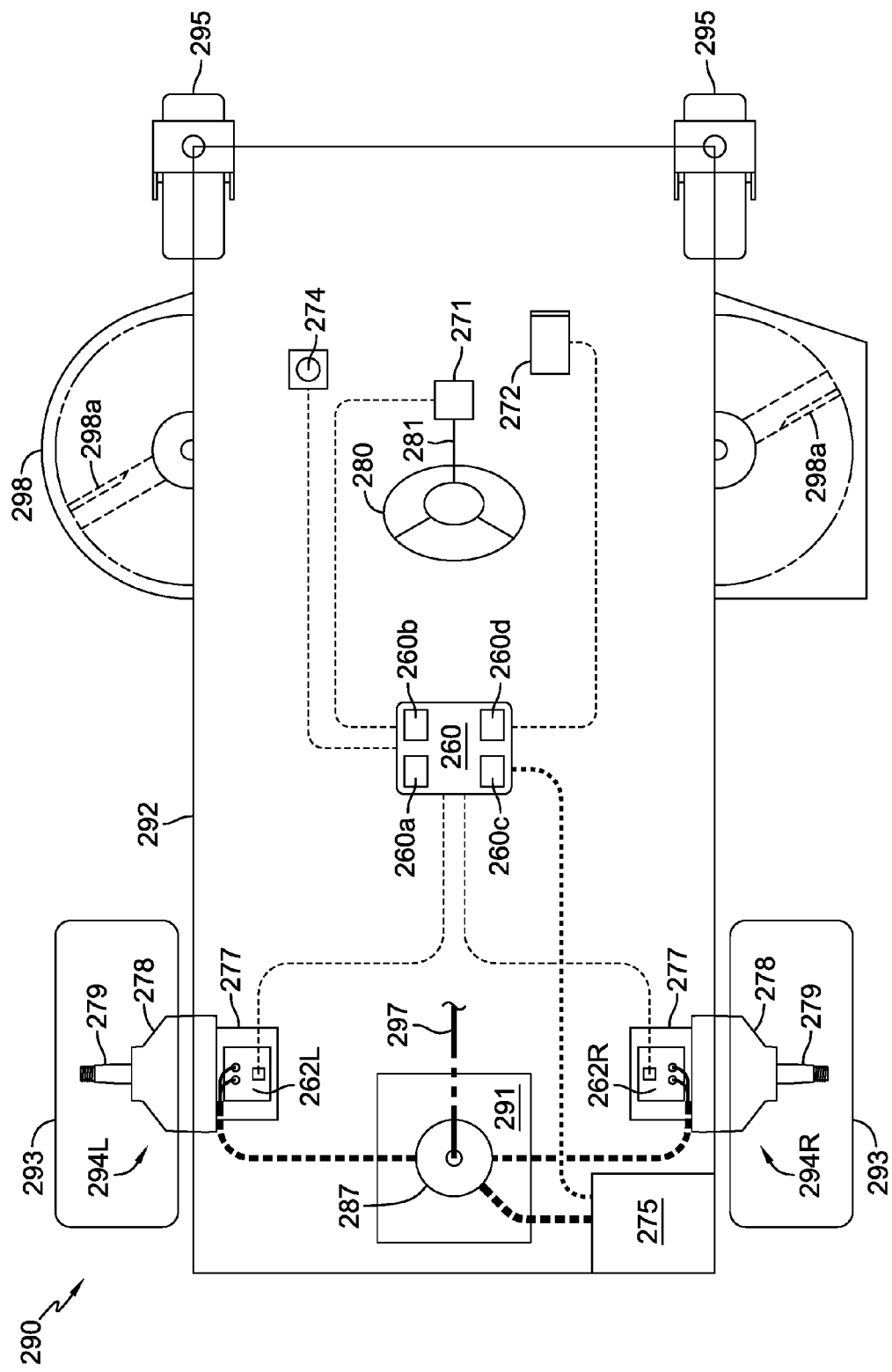
FIG. 2 is a schematic view of a vehicle having standard steering wheel and pedal controls that incorporates a stability control system in accordance with the present invention.

FIG. 2 depicts a second, zero turn vehicle 290 substantially similar in form and function to vehicle 190, except for the operator control devices. In this instance, the steering input device consists of a steering wheel 280 that rotates a steering shaft 281 whose rotational position is communicated to the processor of stability control module 260, and ultimately the motor controllers 262L, 262R of ground drives 294L, 294R respectively, by a signal generated by potentiometer 271. Speed and direction commands are initiated by a signal from a rocker-style accelerator pedal 272 engaged to a potentiometer (not depicted) in a known manner. Though depicted as a single pedal 272, speed and direction inputs can be obtained from separate forward and reverse pedals (not shown). The remaining components of vehicle 290 are substantially similar in form and function to those previously described for vehicle 190 and will not be further detailed herein. The vehicles depicted herein are exemplary and it is contemplated that the stability control system disclosed herein can be used with other vehicles in accordance with its teachings.

Stability control module 160 contains a 3-axis gyroscope 160a for understanding the orientation of the vehicle 190 in space, a 3-axis accelerometer 160b for understanding movement of the vehicle along those axes, a processor 160c and a storage device 160d. Stability control module 260 in FIG. 2 can be of similar construction to stability control module 160, and it will be understood that the descriptions of stability control module 160 and vehicle 190 will similarly apply to stability control module 260 and vehicle 290, except as noted. It will also be understood that gyroscope 160a, 260a, accelerometer 160b, 260b, processor 160c, 260c and storage device 160d, 260d may be of standard design programmed in accordance with the disclosure herein and form a part of the respective stability control modules 160, 260. It will also be understood that certain components such as gyroscope 160a, 260a, and accelerometer 160b, 260b could be mounted on vehicles 190, 290 separate from stability controller 160, 260, and these components need not be in the same housing or structure.

The processor 160c of stability control module 160 receives inputs from the operator input devices previously described indicative of desired speed and directional outputs for each of the ground drives 194L and 194R. A zero turn vehicle, such as vehicle 190, differentially steers by varying the rotational speed and direction of the drive wheels 193. In the event that the rotational speed and direction of the drive wheels 193 are substantially identical, vehicle 190 will track along a straight path. While the inputs from the individual control sticks 183a, 183b of vehicle 190 and their respective potentiometers 184a, 184b have a direct correspondence to the desired outputs of the individual ground drives 194L, 194R, the inputs from steering wheel 280 and accelerator pedal 272, and their respective potentiometers 271, must be evaluated by the processor of stability control module 260 in a more complex fashion to discern the desired outputs for individual ground drives 294l, 294R.

The processor 160c of stability control module 160 further receives inputs from their respective 3-axis gyroscope 160a and 3-axis accelerometer 160b to adjust and modify the command signals sent to the motor controllers 162L, 162R in response to environmental effects on the vehicle 190 such as surface conditions (which can produce wheel slip), ground slope, and the like. The current allocated to each electric motor 177 determines both the speed and rotational direction of the output axles 179. Because this current varies with environmental load factors to produce a target vehicle speed and direction, and the 3-axis gyroscope 160a and 3-axis accelerometer 160b can provide the processor with feedback as to deviation from the target vehicle speed and direction, a vehicle equipped with the stability control system described herein can accomplish enhanced straight line tracking, wheel slip and traction control, hillside stability and rollover protection. The flowchart depicted in FIGS. 3-8 outlines the behaviors attributable to the stability control system disclosed herein.

Figure 3:
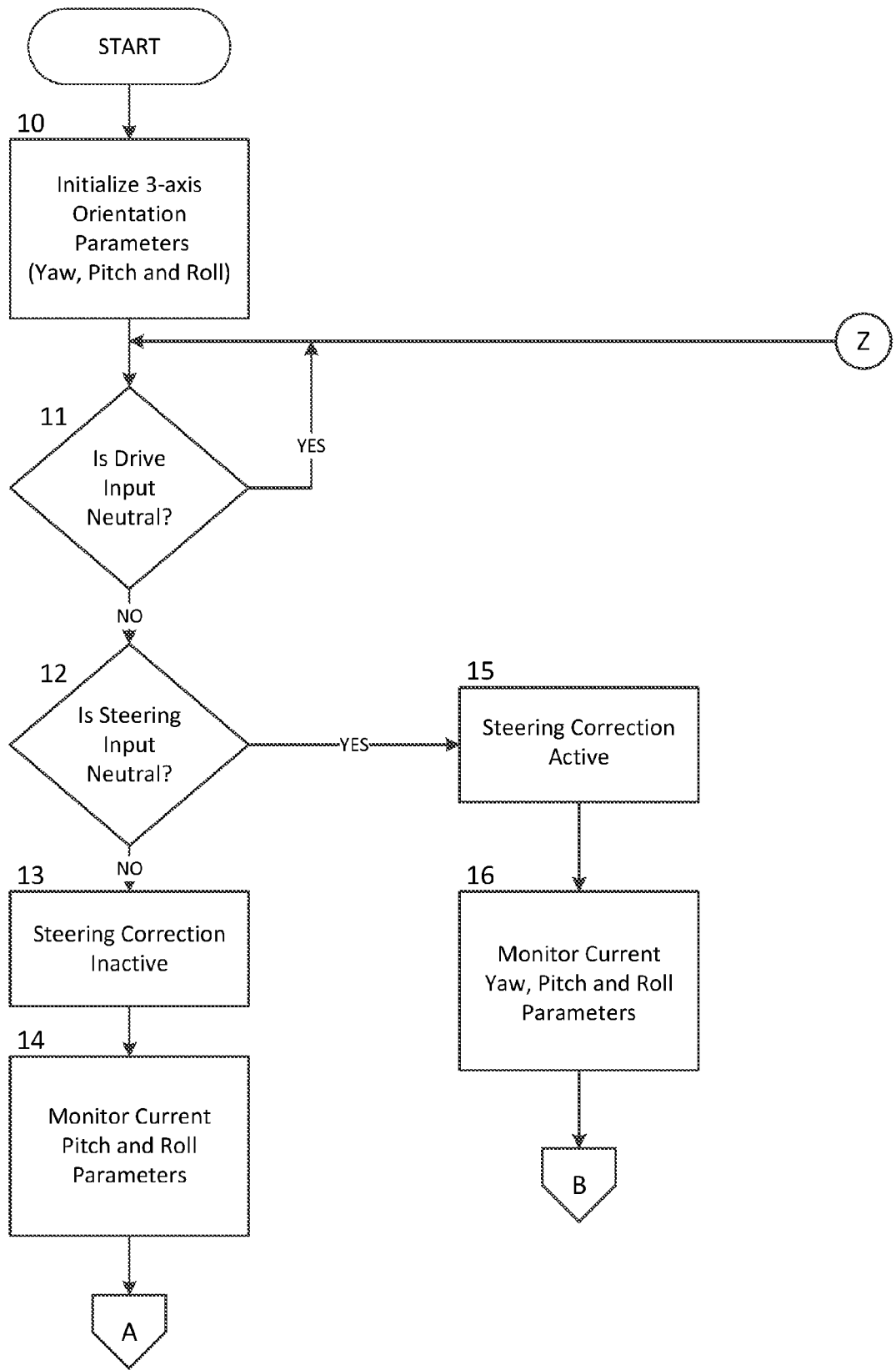
FIG. 3 is a portion of a flow chart of the stability control system disclosed herein, depicting activation of a steering correction feature.

In a first step 10 upon vehicle startup, as depicted in FIG. 3, the stability control module 160 initializes or zeros the 3-axis orientation parameters provided by its 3-axis gyroscope 160a and stores them for reference purposes. For simplicity, the 3-axis orientation parameters will be defined with respect to vehicle heading or yaw, vehicle inclination or pitch, and lateral tilt of the vehicle or roll, while fully appreciating that yaw, pitch and roll may typically describe dynamic phenomena. Next, the processor 160c, 260c determines the positional status of the drive input(s), i.e. the position of each control stick 183a, 183b, or that of the accelerator pedal 272, in the forward or reverse direction away from a neutral position (step 11). If the operator controls indicate a neutral intent, no drive commands are relayed to the ground drives 194L, 194R and no stability control features are engaged. If the operator controls indicate a non-neutral intent, the processor then determines the positional status of the steering input(s) (step 12). For vehicle 190, this equates to a differential position between the two control sticks 183a, 183b. The degree to which the two control sticks 183a, 183b can vary from the same forward or reverse position and still permit actuation of a steering correction feature (step 15), i.e. indicate an operator's intent to travel in a straight line or prevent change in the yaw parameter, can be programmed into the stability control module 160 as a steering deadband. For vehicle 290, this determination equates to a programmed deadband pertaining to rotation of steering shaft 281 away from a calibrated neutral steering position, e.g. the center point of a 0-5 V range of potentiometer outputs. If the steering input is non-neutral, i.e. indicative of an operator's intent to turn the vehicle 190 the steering correction feature is not active (step 13). Anytime the steering input falls within the programmed deadband, the steering correction feature of the stability control system is active (step 15). Whether active or inactive, the stability control system monitors the current pitch and roll parameters, and in the case of intended straight line tracking, the yaw parameter as well (steps 14 and 16 respectively).

Figure 4:
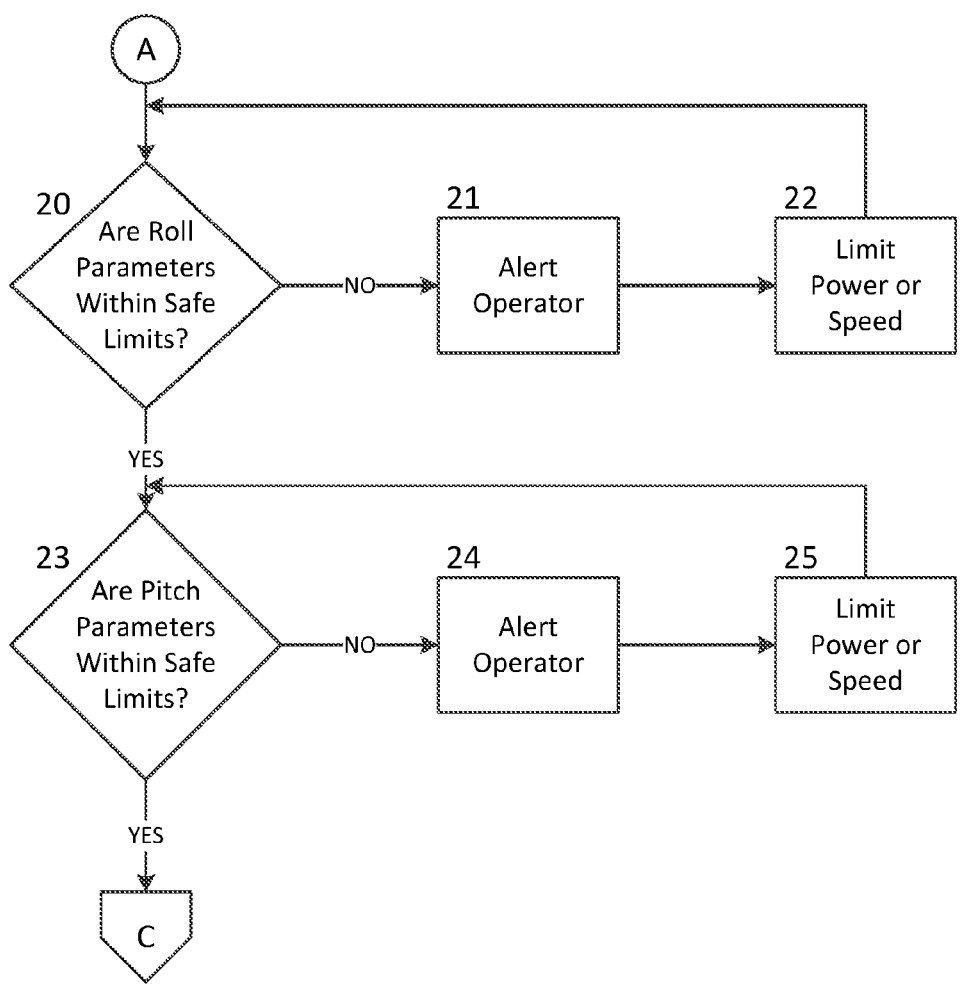
FIG. 4 is a portion of the flow chart depicting a rollover protection feature available when the steering correction feature is not active.
Figure 5:
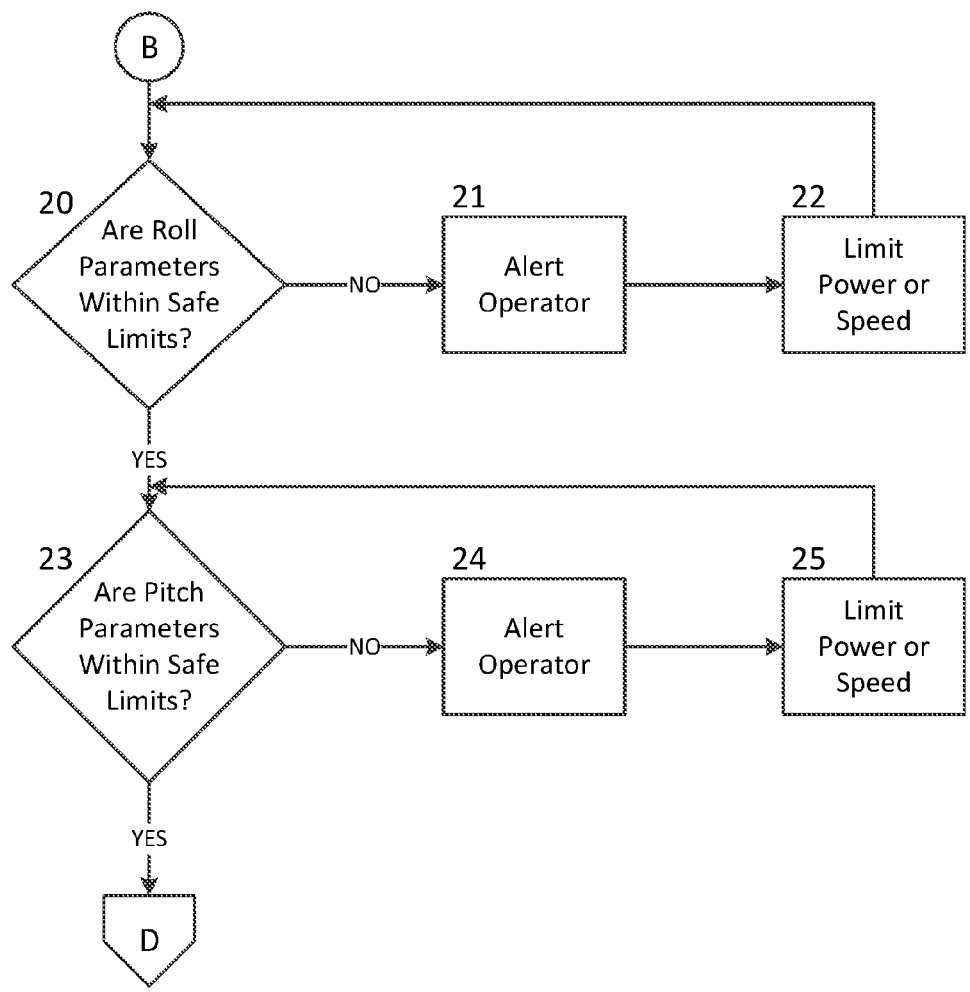
FIG. 5 is a portion of the flow chart depicting the rollover protection feature of FIG. 4 as accessed when the steering correction feature is active.

FIGS. 4 and 5 indicate that, regardless of the status of the steering correction feature, i.e. whether the vehicle 190 is turning or being steered in a straight line, the roll and pitch parameters are continually being compared to the initialized values of each (steps 20 and 23 respectively). In the event the current roll or pitch parameter deviates from the initial values beyond preprogrammed thresholds related to vehicle design such as weight, wheelbase, center of gravity, and the like, an audible or visual warning mechanism 174 is triggered (steps 21 and 24 respectively) to alert the operator to a potentially hazardous operating condition. In addition, the power supplied to the ground drives 194L, 194R or the maximum vehicle speed can be limited by commands supplied by the stability control module 160 to the respective motor controllers 162L, 162R (steps 22 and 25 respectively). This feature of the stability control system provides the operator of the vehicle with rollover protection. While FIGS. 4 and 5 indicate sequential evaluation of roll and pitch parameters, this is representational only for ease of understanding, and it is understood that with respect to microprocessor speeds, this review effectively occurs simultaneously and could be represented in parallel.

Figure 6:
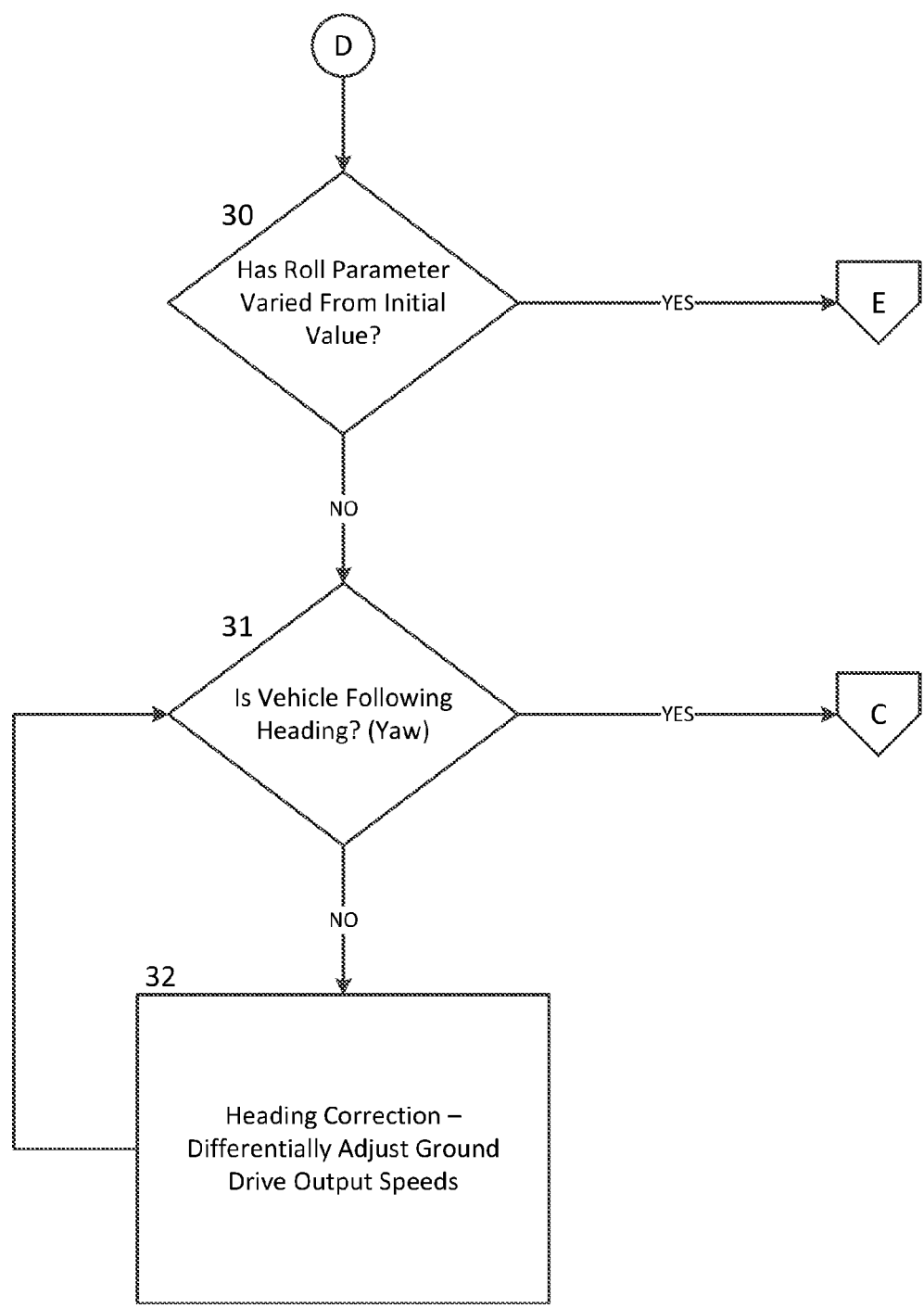
FIG. 6 is a portion of the flow chart depicting a straight line tracking feature.
Figure 7:
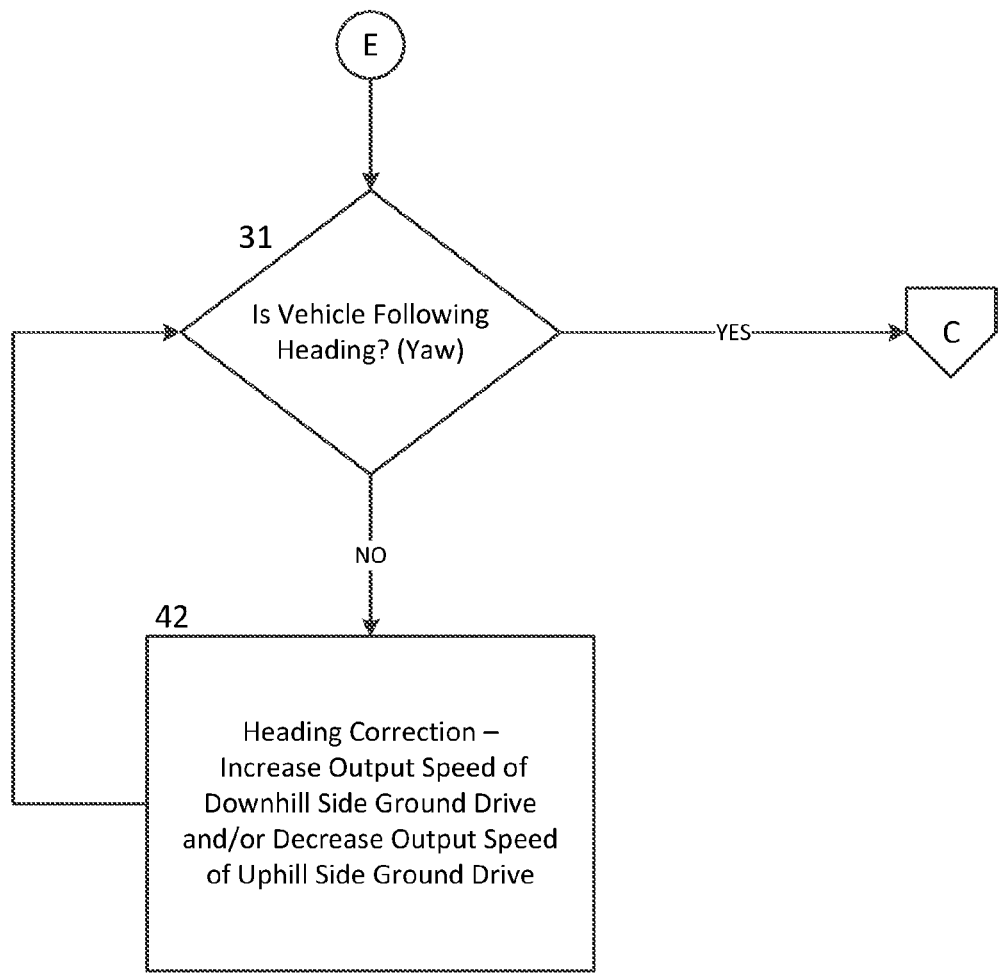
FIG. 7 is a portion of the flow chart depicting a hillside stability or tracking feature.

FIGS. 6 and 7 outline the straight line tracking feature of the stability control system as applied to a vehicle 190 on level ground and on a hillside, respectively. Zero turn vehicles tracking across a hillside want to nose downhill under the effects of gravity. An operator of such a vehicle tends to differentially steer the vehicle to maintain a straight track, i.e. provide a greater power input to the downhill ground drive or a lesser power input to the uphill ground drive requiring additional operator attention and potentially increasing operator fatigue during operation of the vehicle 190. In step 30, comparison of the current roll parameter to its initial value determines the ground topography. In step 31, regardless of level ground or hillside location, the vehicle heading or instantaneous yaw parameter is continually checked against that value captured in step 16 upon activation of the steering correction feature. In the event of deviation of the vehicle heading outside a preprogrammed limit, the stability control system will correct the vehicle heading to the desired track by means of differential steering of the left and right-side ground drives 194L, 194R on level ground (step 32 requiring yaw parameters only) and further requiring an understanding of uphill and downhill side positioning of the respective ground drives (step 42 requiring yaw parameters for tracking and roll parameters for specifying the relative uphill and downhill positions). In either case, the 3-axis accelerometer can provide the processor of the stability control module 160 with the rate of deviation from the target heading, whereby the steering correction feature can more aggressively return a wayward vehicle back to the target heading. These rates and reactions can be preprogrammed into the processor.

Figure 8:
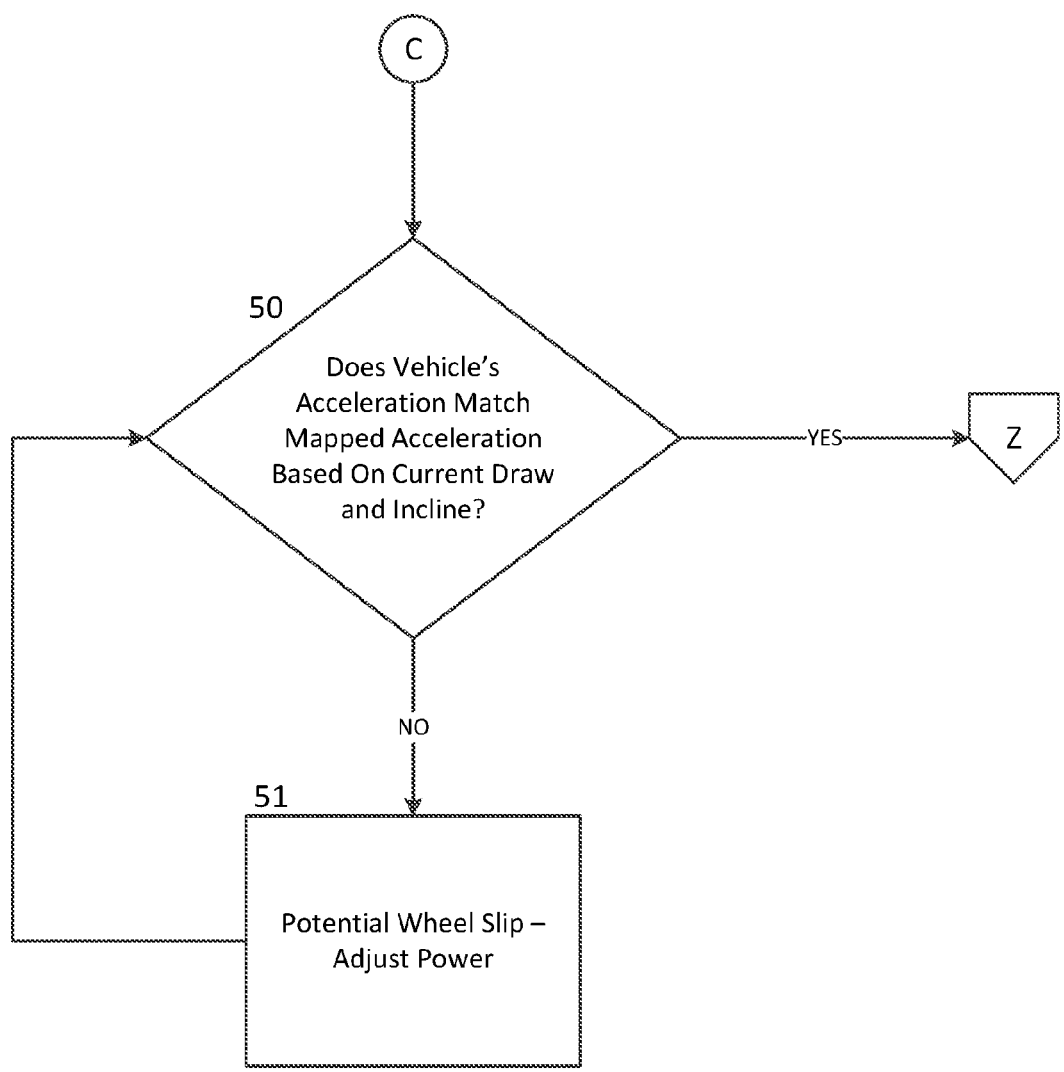
FIG. 8 is a portion of the flow chart depicting a wheel slip and traction control feature.

FIG. 8 outlines a traction control feature of the stability control system in which the vehicle's actual acceleration, whether travelling in a straight line or turning, is compared to a map of expected acceleration stored in the stability control module 160. That map is based on expected vehicle acceleration for a given current draw and incline or pitch. Deviation from the expected outcome can be indicative of wheel slip. Correction of the condition generally requires a (downward) adjustment of power to the ground drives 194L, 194R, until an expected acceleration is achieved, indicative of the resumption of acceptable traction.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A drive and control system for use on a vehicle having a prime mover, a pair of driven wheels, and a pair of drive motors, each drive motor being engaged to and independently driving one of the pair of driven wheels to provide zero turn capability to the vehicle, the drive and control system comprising:
   an operator mechanism configured to generate a drive signal and a steering signal, wherein:
      the drive signal corresponds to a neutral drive position of the operator mechanism or to one of a plurality of non-neutral drive positions of the operator mechanism; and
      the steering signal corresponds to a neutral steering position of the operator mechanism or to one of a plurality of non-neutral steering positions of the operator mechanism;
   a plurality of sensors disposed on the vehicle and capable of generating sensor signals corresponding to sensed roll parameters, sensed pitch parameters and sensed yaw parameters; and
   a stability control module comprising a processor connected to the operator mechanism for receiving the drive signal and the steering signal, the stability control module being connected to and capable of providing output signals to the pair of drive motors;
   wherein the processor is configured to:
      (a) load an initial roll parameter, an initial pitch parameter, and an initial yaw parameter;
      (b) if the drive signal corresponds to one of the non-neutral drive positions, and if the steering signal corresponds to the neutral steering position, activate a steering correction feature;
      (c) if the drive signal corresponds to one of the non-neutral drive positions, perform a roll comparison by comparing at least one of the sensed roll parameters to the initial roll parameter and, in response to a first outcome of the roll comparison, limit power supplied to the pair of drive motors, enforce a first predetermined maximum vehicle speed, or provide an audible or visual warning; and
      (d) if the drive signal corresponds to one of the non-neutral drive positions, perform a pitch comparison by comparing at least one of the sensed pitch parameters to the initial pitch parameter and, in response to a first outcome of the pitch comparison, limit power supplied to the pair of drive motors, enforce a second predetermined maximum vehicle speed or provide an audible or visual warning.

2. The drive and control system of claim 1, wherein the operator mechanism comprises a pair of control sticks, each having a plurality of operative positions, wherein the drive signal and the steering signal are generated based on the operative positions of the pair of control sticks.

3. The drive and control system of claim 2, further comprising a first potentiometer communicating the operative position of one of the pair of control sticks to the processor and a second potentiometer communicating the operative position of the other of the pair of control sticks to the processor.

4. The drive and control system of claim 3, wherein the processor determines if the drive signal corresponds to the neutral drive position by evaluating the operative position of each control stick and determines if the steering signal corresponds to the neutral steering position by evaluating the differential between the operative positions of the pair of control sticks.

5. The drive and control system of claim 4, wherein the processor may be programmed to select the magnitude of the differential position between the pair of control sticks at which the steering signal corresponds to the neutral steering position.

6. The drive and control system of claim 1, wherein the operator mechanism comprises an accelerator pedal and a steering wheel, wherein the processor determines if the drive signal corresponds to the neutral drive position of the operator mechanism by evaluating the operative position of the accelerator pedal and determines if the steering signal corresponds to the neutral steering position of the operator mechanism by evaluating the rotational position of the steering wheel.

7. The drive and control system of claim 1, wherein the processor is configured to, in response to activation of the steering correction feature:
   perform a first heading correction that differentially steers the pair of driven wheels based on one or more of the sensed yaw parameters, but not based on the sensed roll parameters; and
   perform a second heading correction that differentially steers the pair of driven wheels based on one or more of the sensed yaw parameters and based on one or more of the sensed roll parameters.

8. The drive and control system of claim 1, wherein the roll comparison compares a difference between the sensed roll parameters and the initial roll parameter to a first preprogrammed threshold related to at least one of the following vehicle design characteristics: weight of the vehicle, wheelbase of the vehicle or the center of gravity of the vehicle.

9. The drive and control system of claim 1, wherein the pitch comparison compares a difference between the sensed pitch parameters and the initial pitch parameter to a second preprogrammed threshold related to at least one of the following vehicle design characteristics: weight of the vehicle, wheelbase of the vehicle or the center of gravity of the vehicle.

10. The drive and control system of claim 1, wherein the processor is configured not to activate the steering correction feature if the steering signal corresponds to one of the plurality of non-neutral steering positions.

11. The drive and control system of claim 1, wherein the processor is configured to:
   load an expected acceleration and determine an actual acceleration;
   generate an acceleration comparison by comparing the expected acceleration to the actual acceleration; and,
   in response to a first outcome of the acceleration comparison, decrease power to at least one of the pair of drive motors.

12. The drive and control system of claim 11, wherein the processor is configured to load the expected acceleration based on a measured current draw and at least one of the sensed pitch parameters.

13. The drive and control system of claim 12, further comprising a generator connected to the pair of drive motors, and the measured current draw is an electric current supplied from the generator to one or both of the pair of drive motors.

14. The drive and control system of claim 11, wherein, in response to a second outcome of the acceleration comparison, wherein the second outcome comprises detecting that the expected acceleration matches the actual acceleration, the processor is configured to maintain or increase power to the at least one of the pair of drive motors.

15. The drive and control system of claim 11, wherein the processor is configured to compare the actual acceleration to the expected acceleration after performing the roll comparison and the pitch comparison.

16. The drive and control system of claim 1, wherein the processor may be programmed to include a steering deadband where the steering signal corresponds to the neutral steering position when the operator mechanism is in a plurality of steering positions.

17. The drive and control system of claim 1, wherein the pair of drive motors comprises a pair of electric drive motors, each electric drive motor having a motor controller, and the stability control module is connected to each of the motor controllers.

18. The drive and control system of claim 1, wherein the plurality of sensors comprises a gyroscope and an accelerometer.

19. The drive and control system of claim 18, wherein the gyroscope and the accelerometer are integral with the stability control module.

20. The drive and control system of claim 18, wherein the gyroscope is a 3-axis gyroscope, and the accelerometer is a 3-axis accelerometer.

21. A drive and control system for use on a vehicle having one or more driven wheels, the drive and control system comprising:
   a plurality of operator inputs, comprising:
      an operator drive input having a neutral drive position and a plurality of non-neutral drive positions; and
      an operator steering input having a neutral steering position and a plurality of non-neutral steering positions;
   at least one drive motor engaged to and driving at least one driven wheel;
   a plurality of sensors disposed on the vehicle and capable of generating sensor signals corresponding to sensed roll parameters, sensed pitch parameters, and sensed yaw parameters;
   a stability control module comprising a processor connected to the plurality of operator inputs, the stability control module being connected to and capable of providing output signals to the at least one drive motor;
   wherein the processor is configured to:
      (a) determine whether the operator drive input is in one of the non-neutral drive positions;
      (b) determine whether the operator steering input is in the neutral steering position;
      (c) if the operator drive input is in one of the non-neutral drive positions, and if the operator steering input is in the neutral steering position, activate a steering correction feature;
      (d) if the operator drive input is in one of the non-neutral drive positions, perform a roll comparison by comparing at least one of the sensed roll parameters to an initial roll parameter and, in response to a first outcome of the roll comparison, limit power supplied to the at least one drive motor, enforce a first predetermined maximum vehicle speed or provide an audible or visual warning; and
      (e) if the operator drive input is in one of the non-neutral drive positions, provide a pitch comparison by comparing at least one of the sensed pitch parameters to an initial pitch parameter and, in response to a first outcome of the pitch comparison, limit power supplied to the at least one drive motor, enforce a second predetermined maximum vehicle speed or provide an audible or visual warning.

22. A method of operating a vehicle, the vehicle comprising:
   a pair of driven wheels, and a drive and control system comprising:
      a plurality of operator inputs, comprising an operator drive input having a neutral drive position and a plurality of non-neutral drive positions and an operator steering input having a neutral steering position and a plurality of non-neutral steering positions;
      a pair of drive motors, each drive motor being engaged to and driving at least one of the pair of driven wheels;
      a plurality of sensors disposed on the vehicle and capable of generating sensor signals corresponding to sensed roll parameters, sensed pitch parameters, and sensed yaw parameters; and
      a stability control module comprising a processor connected to the plurality of operator inputs, the stability control module being connected to and capable of providing output signals to the pair of drive motors;
   the method comprising, via the processor:
      (a) determining whether the operator drive input is in one of the non-neutral drive positions;
      (b) determining whether the operator steering input is in the neutral steering position;
      (c) if the operator steering input is in the neutral steering position, activating a steering correction feature;
      (d) if the operator drive input is in one of the non-neutral drive positions, providing a roll comparison by comparing at least one of the sensed roll parameters to an initial roll parameter and, in response to a first outcome of the roll comparison, limiting power supplied to the drive motors or enforcing a first predetermined maximum vehicle speed or providing an audible or visual warning; and
      (e) if the operator drive input is in one of the non-neutral drive positions, providing a pitch comparison by comparing at least one of the sensed pitch parameters to an initial pitch parameter and, in response to a first outcome of the pitch comparison, limiting power supplied to the drive motors or enforcing a second predetermined maximum vehicle speed or providing an audible or visual warning.

23. The method of claim 22, comprising, in response to activation of the steering correction feature, performing a first heading correction that differentially steers the driven wheels based on one or more of the sensed yaw parameters, but not based on the sensed roll parameters.

* * * * *